United States Patent [19]
Smith

[11] Patent Number: 5,842,707
[45] Date of Patent: Dec. 1, 1998

[54] SINGLE WHEEL ZERO TURN RIDING SULKY FOR USE WITH A SELF-PROPELLED VEHICLE

[76] Inventor: Jeffrey Hayes Smith, 3350 Bayliss Dr., Oxford, Mich. 48371

[21] Appl. No.: 914,637

[22] Filed: Aug. 19, 1997

[51] Int. Cl.⁶ .................................................. B62D 63/00
[52] U.S. Cl. .............................................. 280/32.7; 280/78
[58] Field of Search ............................ 280/32.7, 78, 63, 280/65

[56] References Cited

U.S. PATENT DOCUMENTS

| | | |
|---|---|---|
| 318,396 | 4/1885 | Doyle . |
| 904,754 | 11/1908 | Brownlee . |
| 1,152,200 | 8/1915 | Moen . |
| 1,255,509 | 2/1918 | Bridenstine . |
| 1,385,535 | 1/1920 | Frisky ................................. 280/32.7 |
| 3,336,042 | 8/1967 | Southhall ............................ 280/32.7 |
| 4,372,569 | 2/1983 | Otterson . |
| 4,413,693 | 11/1983 | Derby . |
| 4,998,948 | 3/1991 | Osterling . |
| 5,004,251 | 4/1991 | Velke et al. . |
| 5,118,123 | 6/1992 | Betrock ............................... 280/32.7 |
| 5,368,325 | 11/1994 | Hazen . |
| 5,385,355 | 1/1995 | Hoffman . |
| 5,413,364 | 5/1995 | Hafendorfer . |

*Primary Examiner*—Christopher P. Ellis
*Attorney, Agent, or Firm*—Gifford, Krass, Groh, Sprinkle, Patmore, Anderson & Citkowski, P.C.

[57] ABSTRACT

A riding sulky attachment for use with a conventional self-propelled vehicle, the vehicle including a body with front and rear wheels, a self-propelling drive mechanism and a steering assembly including a pair of operating handles extending upwardly and rearwardly from the vehicle body. The riding sulky attachment includes an elongate frame constructed of a first member, a second elevated and parallel extending member and a third angularly disposed and interconnecting member. A forward end of the elongate frame is releasably secured to a rear of the vehicle in a pivotal manner about a first horizontal axis. A carriage assembly supporting a single wheel extends downwardly from a rear end of the elongate frame and is rotatably secured to the elongate frame about a second vertical axis. An elongate cantilever member is secured to an intermediate location along the elongate frame and extends upwardly and in angular fashion relative to the elongate frame. A seat is mounted to a remote end of the cantilever member for supporting an operator at a spaced apart and elevated distance above the elongate frame and within easy reach of the operating handles extending from the vehicle.

17 Claims, 2 Drawing Sheets

SINGLE WHEEL ZERO TURN RIDING SULKY FOR USE WITH A SELF-PROPELLED VEHICLE

BACKGROUND OF THE INVENTION

1. Field of the Invention

The present invention relates generally to riding attachments for use with self-propelled vehicles and, more particularly, to a single wheel zero turn riding sulky attachment for use with a self-propelled vehicle, particularly a walk-behind mower.

2. Description of the Prior Art

Riding sulky devices are well known in the art for supporting an operator of a powered vehicle. An example of such a sulky is disclosed in U.S. Pat. No. 4,998,948, issued to Osterling, which teaches a lawn mower device having a forwardly directed power and cutting unit and a rearwardly directed riding unit. The cutting unit and riding unit are manufactured together as a single device, with the riding unit including a frame means secured to the power and cutting unit by a pair of shock absorbing units. A steering assembly including a pair of handlebars extends upwardly from the riding unit and a sheave and yolk assembly includes cable which interconnects a base member of the steering assembly with a rearwardly mounted wheel in order to operate the mower assembly by turning the wheel in one direction or the other.

While providing an effective self-propelled riding mower, the riding sulky in Osterling is not suited for use as a separate attachment for conventional walk-behind mowers which are currently in use. Osterling further requires a fairly elaborate design for the riding sulky attachment, including the use of shock absorbing units and the necessity of a built in steering mechanism.

U.S. Pat. No. 5,413,364, issued to Hafendorfer, teaches a sulky attachment for a self-propelled lawnmower, the sulky including a pair of wheels mounted to an axle and a standing platform portion upon which an operator may stand. A series of first, second and third pivotal elements are employed along first and second horizontally disposed connecting arms and permit the platform sulky to rotate relative to the self-propelled vehicle. While providing a useful device to permit the operator to maintain a standing position while operating the self-propelled mower, the device of Hafendorfer does not provide any accommodation which permits the operator to assume a seated position.

SUMMARY OF THE PRESENT INVENTION

The present invention is a riding sulky attachment for use with a self-propelled vehicle, the vehicle including forward and rearwardly positioned wheels, a self-propelling drive mechanism, and a steering assembly including a pair of handles projecting upwardly and rearwardly from the vehicle. The self-propelled vehicle is preferably a conventional walk-behind mower having a mower deck incorporated into a body of the vehicle.

The riding sulky attachment according to the invention includes an elongate frame having a first horizontally disposed member, a second elevated and parallel extending member and a third upwardly and angularly extending member interconnecting the first member and second member. The interconnecting members are preferably rectangular in cross section with faces having desired thicknesses and with an interior that may be partially hollowed in order to reduce the overall weight of the attachment. An elongate cantilever member extends from an intermediate location along said elongate frame in an upward and angular fashion relative to the elongate frame. A seat is mounted to a remote end of the cantilever member in order to space an operator at an elevated distance above the elongate frame.

A forward end of the sulky is releasably attachable to the body of the self-propelled vehicle and includes a cross member which is secured to the first horizontal member, the cross member including a pair of tubular sleeve shaped portions which are arranged lengthwise along the first cross member in a spaced apart and segmented fashion. A second elongate cross member is secured to a rear facing surface of the self-propelled vehicle and also includes a pair of second tubular sleeve shaped portions which are arranged in a spaced apart and segmented fashion such that, upon positioning the first cross member relative to the second cross member, the first and second tubular sleeve portions define in combination a continuous channel. An elongate pin is provided having an inserting shaft portion and an enlarged head portion and is inserted through the continuous sleeve shaped channel and held in place by a retaining clip to pivotally mount the sulky about a horizontal axis and in a freely rotatable fashion.

A wheel assembly is mounted to a rearward end of the elongated frame and includes an interiorly hollow and tubular member which is mounted to and extends downwardly from an underside of the second elevated and parallel extending elongate member of the frame. A carriage assembly is rotatably mounted about a vertical axis defined by the hollow interior of the tubular member and includes an upwardly extending shaft portion which is axially inserted within the tubular member and a lower wheel supporting bracket to which is mounted a freely rotatable wheel. A locking pin is engaged through an upward end of the shaft portion which projects beyond the interiorly hollow tubular member in order to rotatably engage the carriage assembly to the elongate frame. In use, the carriage and wheel assembly rotates about the vertical axis in response to turns executed by the self-propelled vehicle to permit the elongate frame to remain in a zero turn position relative to the self-propelled vehicle and to improve the ability of the user to operate the vehicle.

BRIEF DESCRIPTION OF THE DRAWINGS

Reference will now be had to the attached drawings, when read in combination with the following detailed description, wherein like reference numerals refer to like parts throughout the several views, and in which.

DESCRIPTION OF THE PREFERRED EMBODIMENT

Figure 1:
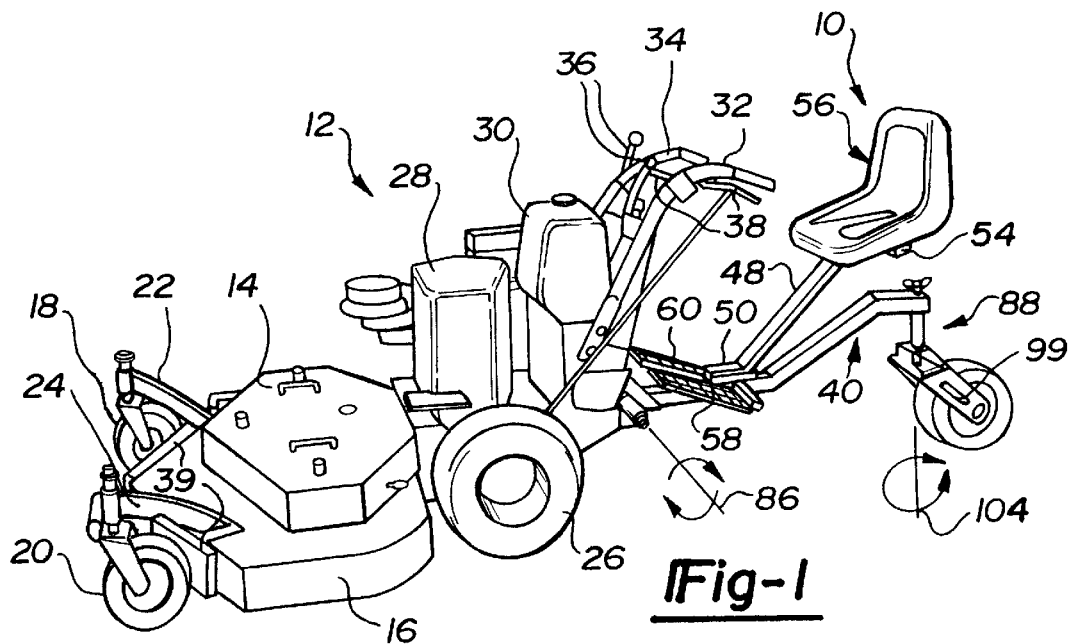
FIG. 1 is an overall view in perspective of the riding sulky attachment according to the present invention secured to a conventional walk behind and self-propelled lawn mower.
Figure 2:
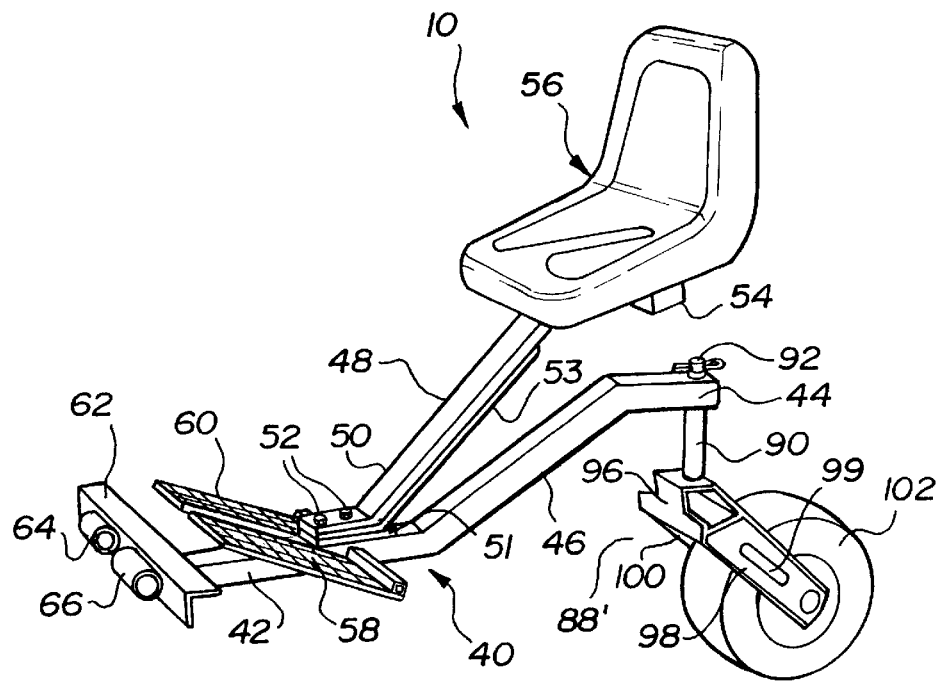
FIG. 2 is a sectional view of the riding sulky attachment according to the present invention apart from the self-propelled vehicle.

Referring now to FIGS. 1 and 2, a riding sulky attachment 10 is shown for use with a conventional self-propelled vehicle 12 according to the present invention. The vehicle 12 is in the preferred embodiment a conventional walk-behind mower and includes a body 14 incorporating a mower deck 16 with internally mounted and rotatable mower blades which are not evident but are well known in the art. A first castor assembly 18 and a second castor assembly 20 are provided and are attached to a forward end of the vehicle body 14 by a first forwardly disposed member 22 and a second forwardly disposed member 24. A complementary pair of rear wheels are provided at a rearward end of the vehicle body and is illustrated in FIG. 1 by tire 26. A corresponding opposite tire is also provided but is hidden from view and, in combination with the tire 26, provides a carriage assembly for the vehicle 12. The vehicle also includes a motor 28 and a fuel supply 30 for driving the vehicle 12 as well as a steering mechanism provided by a pair of upwardly and rearwardly extending handles 32 and 34 which incorporate throttle members 36 and each handle further including a handlebar mounted member 38 for driving and steering the self-propelled vehicle 12. Also, counterweight members 39 constructed of a heavy weighted material may be secured to the forward end of the mower deck 16 as shown to act as a counterbalance to the load forces of the sulky attachment as will be subsequently described to prevent lifting of the mower during operation.

Referring again to FIGS. 1 and 2, the riding sulky attachment 10 has an elongate frame 40 including a first horizontally disposed member 42 defining a forward end of the sulky 10, a second elevated and parallel extending member, defining a rearward end of the sulky 10 and a third upwardly and angularly extending and interconnecting member 46. The elongate frame 40 is preferably constructed of a steel or high strength aluminum but can be of any desirable material exhibiting the necessary properties of strength and durability. The elongate members 42, 44 and 46 of the frame are further illustrated as being rectangular shaped in cross section but can be of any other desirable cross sectional configuration which satisfies the load requirements of the frame 40.

An elongate cantilever member 48 is provided and includes a first angularly extending and flattened end 50 which is mounted to an intermediate location atop a spacer block 51 along the elongate frame 40. Preferably, a pair of fasteners 52 such as bolts are provided and secure the flattened end 50 to the first horizontal member 42 in a location proximate the angled and interconnecting member 46. The cantilever member 48 has a desired thickness and is substantially flattened in cross section and extends upwardly and in angular fashion relative to the frame 40 and particularly the angled interconnecting member 46. Also, a reinforcing stiffening member 53 is provided which is shaped similar to the cantilever member 48 and is mounted in a sandwiched fashion underneath the member 48 as illustrated in FIG. 2 and according to a further preferred embodiment. The stiffening member 53 is engaged by the fasteners 52 and extends to a point short of the chair bottom in a biased fashion against the planar underside of the elongate cantilever member 48.

The cantilever member 48 terminates at a second free end which is illustrated in the first preferred embodiment as a crosswise extending member 54. Mounted atop the crosswise member 54 is a seat or chair 56 which can be either a seat bottom support only or a bottom and back support member such as is illustrated. As is further illustrated in FIG. 4, a substantially planar mounting member 54' is alternatively shown for supporting the chair 56 and may be constructed of a metal or high strength polymer or nylon. Additionally, rubber grommets or like shock absorbing members 55 are located between the chair bottom and the planar mounting member 54' to assist in additional absorbing and cushioning support and bolts 57 are inserted through the chair bottom to secure to the grommets 55.

A first planar shaped and foot supporting portion 58 extends from one side of the elongate frame 40 in proximity to the location of the attachment of the first end 50 with the first horizontal member 42 and a second identical planar shaped and foot supporting portion 60 likewise extends from the other side of the frame 40 in opposing fashion to the first foot supporting portion 58. The foot supporting portions 58 and 60 extend in an upwardly and forwardly angled manner and, in combination with the elongate cantilever member 48 for mounting the seat 56, provide a simplified arrangement for improved shock absorbing of the sulky attachment 10 which is transferred to a rider during operation of the self propelling vehicle.

Figure 3:
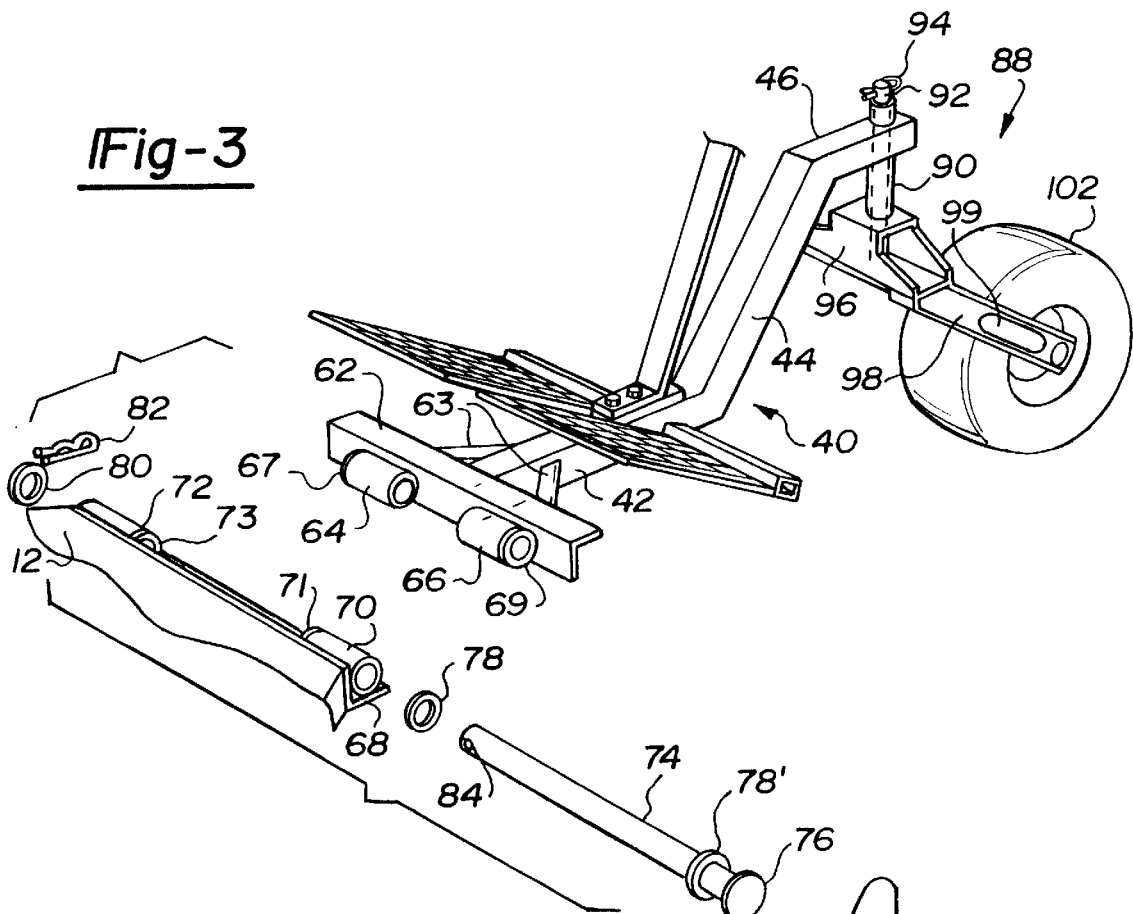
FIG. 3 is an exploded view illustrating the releasable securing means for mounting the riding sulky to the self-propelled vehicle about a first freely pivotal horizontal axis and also illustrates the rear wheel and carriage means for mounting the wheel about a second freely pivotal vertical axis.
Figure 4:
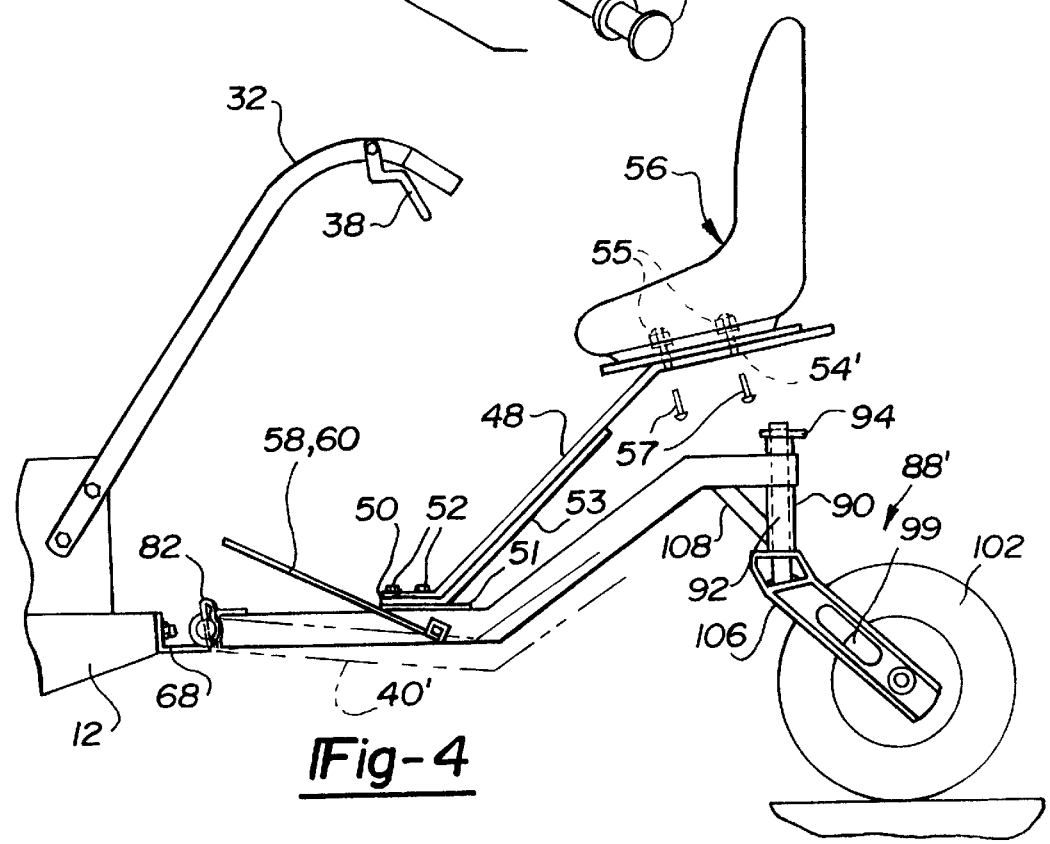
FIG. 4 is a side view similar to FIG. 1 and further illustrating the freely pivotal nature of the first horizontal axis established between the forward end of the elongate frame and the vehicle as well as the absorbing effect provided by the elongate cantilever member which spaces the rider's seat from the frame.

Referring again to FIGS. 1 and 2 and also further referring further to FIGS. 3 and 4, an assembly for releasably securing the riding sulky attachment 10 to the conventional self-propelled vehicle 12 about a first freely pivotal horizontal axis is shown and includes a first elongate cross member 62 which is secured in perpendicular fashion to the forward end of the first horizontal member 42. A pair of angled braces 63 may be secured by welding or the like to the cross member 62 and horizontal member 42 to provide additional strength. The elongate cross member 62 can have any shape or profile in end view but is illustrated as an L-shaped bracket which is welded or otherwise permanently affixed to the elongate frame 40. A first pair of tubular sleeve shaped portions 64 and 66 are fixedly secured to the a forward directed face of the first cross member 62 and are arranged in spaced apart and segmented fashion lengthwise along the forward directed face.

As is best illustrated in FIG. 3, a second elongate cross member 68 is secured to an opposing rear facing surface of the vehicle 12 and is preferably also an L-shaped bracket upon which are fixedly secured a second pair of tubular sleeve shaped portions 70 and 72 arranged in spaced apart and segmented fashion lengthwise along the rearwardly facing surface. A set of four bushings are provided in spaced apart and aligning fashion, two of which are mounted to outer ends of the first pair of tubular sleeve portions 64 and 66 at 67 and 69, respectively, and, two of which are mounted to inner ends of the second pair of tubular sleeve shaped portions 70 and 72 at 71 and 73, respectively. The first cross member 62 is positioned relative to the second cross member 68 such that the segmented arrangement and spacing of the first pair of tubular sleeve shaped portions 64 and 66 and the second pair of sleeve shaped portions 70 and 72 and the opposing bushings 67, 69, 71 and 73 form one continuous and elongated channel.

An pin 74 includes an elongated shaft and an enlarged head portion 76 arranged at one end. The shaft of the pin 74 is inserted through the continuous sleeve formed by the mating first and second tubular sleeve shaped portions 64 and 66 and 70 and 72 and a pair of rotating collars 78 and 80 are located at opposite ends of the continuous channel and are engaged by the pin 74. The collar 78 in a preferred embodiment is fixedly secured to the pin shaft as illustrated at 78' and provides an abutting stop for pin insertion. A pin retaining clip 82 is engaged through an aperture 84 located on a projecting end of the shaft portion of the pin 74 which extends beyond the continuous channel and effectively secures the sulky attachment in a freely rotatable manner about a first vertical axis which is illustrated by axes line 86 in FIG. 1 and also by phantom view 40' of the frame member in a rotated position in FIG. 4.

As is evident in all of the drawing Figures, but best shown in FIGS. 3 and 4, the riding sulky attachment 10 further includes a carriage assembly 88 which is rotatably secured to the rearward end of the elongate frame and is further rotatable about a second vertical axis relative to the elongate frame 40 of the sulky attachment 10. An interiorly hollow and tubular member 90 is mounted to and extends downwardly from the second elevated and parallel extending member 44. The carriage assembly 88 includes an upwardly extending shaft portion 92 which is sized so as to be axially inserted within the hollow interior of the tubular member 90 and is fixedly secured in a rotative fashion by a locking pin 94 which inserts through an aperture (not shown) formed in an upper end of the shaft portion 92 which projects beyond the hollow interior of the tubular member 90.

The carriage assembly 88 is according to a first preferred variant as set forth in FIGS. 1–3 and includes a lower wheel supporting bracket 96 with a first member 98 and a second spaced apart member 100 extending in parallel and terminating at a lower and rearward location for mounting a wheel 102. The spaced apart members 98 and 100 may further be partially hollowed as shown at 99 to reduce materials without sacrificing strength. The carriage assembly 88 is designed so that the wheel 102 is freely rotatable and the assembly 88 is further capable of freely rotating about the second vertical axis, illustrated at 104 in FIG. 1, and permits the remainder of the sulky attachment 10 and the operator to remain in a fixed zero turn and axial relationship relative to the self propelled vehicle 12. As is further illustrated by FIG. 4, a lower wheel supporting bracket 106 can be constructed according to a slightly different configuration and the alternative assembly 88' further includes a brace member 108 for reinforcing the connection between the carriage assembly 88' and the elongate frame 40.

Having described my invention, it is apparent that the present discloses a novel and improved riding sulky attachment which discloses a simplified design and which is further easily detachable or reattachable to a conventional self-propelled vehicle such as a walk behind lawnmower. The riding sulky according to the present invention further provides improved shock absorbing support to the operator and ease of rotation about two different axis in such a fashion that the operator always remains in a zero turn alignment with the rear of the self-propelled vehicle and the operating handles projecting from the vehicle body are within easy reach of the operators hands.

Having described my invention, additional embodiments will become apparent to those skilled in the art to which it pertains without deviating from the scope of the appended claims.

I claim:

1. A riding sulky attachment for use with a self-propelled vehicle, the vehicle including at least one pair of wheels, a self-propelling drive mechanism, and a steering assembly secured to and extending upwardly from the vehicle, said sulky attachment comprising:

an elongate frame having a forward end and a rearward end;

means for releasably securing a forward end of the elongate frame to the vehicle so that said elongate frame is freely pivotal about a first horizontal axis;

wheel means rotatably secured to and extending downwardly from said rearward end of said elongate frame, said wheel means being rotatable relative to said elongate frame about a second vertical axis; and an elongate cantilever member including a first end and a second end, said first end being secured to an intermediate location of said elongate frame and extending in an upward and angular fashion relative said elongate frame, a seat mounted to said second end for supporting an operator at a spaced apart and elevated distance above said elongate frame and within easy reach of the steering assembly extending from the vehicle;

said elongate cantilever member providing the operator with improved shock absorbing capability and said riding sulky attachment capable of quickly being attached and detached from the self-propelled vehicle.

2. The riding sulky attachment according to claim 1, said forward end of said elongate frame further defining a first member and said rearward end defining a second elevated and parallel extending member, a third angular member interconnecting said first member and said second member.

3. The riding sulky attachment according to claim 2, said means for releasably securing said forward end of said elongate frame further comprising:

a first elongate cross member secured to said first horizontal member, said first elongate cross member including at least one first tubular sleeve shaped portion arranged in segmented fashion lengthwise along said first cross member;

a second elongate cross member secured to a rear facing surface of the self-propelled vehicle, said second elongate cross member including at least one second tubular sleeve shaped portion arranged lengthwise along said second cross member in alternating segmented fashion relative to said first sleeve shaped portion, said first cross member being positioned relative to said second cross member so that said at least one first tubular sleeve shaped portion is positioned in alignment in end to end fashion with said at least one second tubular sleeve shaped portion to define in combination a continuous sleeve shaped channel; and an elongate pin having an inserting shaft portion and an enlarged head portion, said pin being inserted through said continuous sleeve shaped channel and a pin retaining clip being engaged through a projecting end of said shaft portion to releasably secure said riding sulky in said freely pivotal fashion about said first horizontal axis.

4. The riding sulky attachment according to claim 3, further comprising bushings secured to oppositely facing ends of said first and second tubular shaped sleeve portions upon alignment to form said continuous sleeve shaped channel.

5. The riding sulky attachment according to claim 2, said wheel means comprising:

an interiorly hollow and tubular member mounted to and extending downwardly from said second elevated and parallel extending member of said elongate frame;

a carriage assembly including an upwardly extending shaft portion axially inserted within said hollow and tubular member and a lower wheel supporting bracket to which is mounted a freely rotatable wheel; and a locking pin being engaged through an upward end of said shaft portion projecting beyond said interiorly hollow tubular member to engage said carriage assembly to said elongate frame;

said carriage assembly rotating about said second vertical axis in response to turns executed by the self-propelled vehicle.

6. The riding sulky attachment according to claim 2, further comprising a first planar shaped and foot supporting portion extending from one side of said elongate frame and a second planar shaped and foot supporting portion extending from the other side of said elongate frame, said first and second foot supporting portions being located at desired locations relative to said seat to provide foot support to the operator.

7. The riding sulky attachment according to claim 2, said first, second and third members of said elongate frame each other comprising a rectangular configuration in cross section.

8. The riding sulky attachment according to claim 1, further comprising a reinforcing stiffening member mounted to said elongate frame and extending in a resiliently biased fashion against an underside of said elongate cantilever member.

9. The riding sulky attachment according to claim 1, further comprising a plurality of rubberized grommets positioned within an underside of said seat and which receive fasteners for securing said seat to said second end of said elongate cantilever member.

10. A combination self-propelled vehicle and riding sulky attachment, comprising:

said vehicle including a body incorporating self-propelling drive means and having a first pair of forwardly arranged wheels and a second pair of rearwardly arranged wheels, a steering assembly including a pair of operating handles and extending upwardly and rearwardly from said body;

said riding sulky including an elongate frame having a forward end and a rearward end and means for releasably securing said forward end to the vehicle body so that said elongate frame is freely pivotal about a first horizontal axis;

wheel means rotatably secured to and extending downwardly from said rearward end of said elongate frame, said wheel means being rotatable relative to said elongate frame about a second vertical axis; and an elongate cantilever member including a first end and a second end, said first end being secured to an intermediate location of said elongate frame and extending in an upward and angular fashion relative said elongate frame, a seat mounted to said second end for supporting an operator at a spaced apart and elevated distance above said elongate frame and within easy reach of said pair of operating handles;

said elongate cantilever member providing the operator with improved shock absorbing capability and said riding sulky attachment capable of quickly being attached and detached from said vehicle.

11. The combination self-propelled vehicle and riding sulky attachment according to claim 10, said forward end of said riding sulky further defining a first member and said rearward end defining a second elevated and parallel extending member, a third angular member interconnecting said first member and said second member.

12. The combination self-propelled vehicle and riding sulky attachment according to claim 11, said means for releasably securing said forward end of said elongate frame further comprising:

a first elongate cross member securing to said first horizontal member, said first elongate cross member including at least one first tubular sleeve shaped portion arranged in segmented fashion lengthwise along said first cross member;

a second elongate cross member secured to a rear facing surface of said self-propelled vehicle body, said second elongate cross member including at least one second tubular sleeve shaped portion arranged lengthwise along said second cross member in alternating segmented fashion relative to said first sleeve shaped portion, said first cross member being positioned relative to said second cross member so that said at least one first tubular sleeve shaped portion is positioned in alignment in end to end fashion with said at least one second tubular sleeve shaped portion to define in combination a continuous sleeve shaped channel; and an elongate pin having an inserting shaft portion and an enlarged head portion, said pin being inserted through said continuous sleeve shaped channel and a pin retaining clip being engaged through a projecting end of said shaft portion to releasably secure said riding sulky in said freely pivotal fashion about said first horizontal axis.

13. The combination self-propelled vehicle and riding sulky attachment according to claim 11, said wheel means comprising:

an interiorly hollow and tubular member mounted to and extending downwardly from said second elevated and parallel extending member of said elongate frame of said riding sulky;

a carriage assembly including an upwardly extending shaft portion axially inserted within said hollow and tubular member and a lower wheel supporting bracket to which is mounted a freely rotatable wheel; and a locking pin being engaged through an upward end of said shaft portion projecting beyond said interiorly hollow tubular member to engage said carriage assembly to said elongate frame;

said carriage assembly rotating about said second vertical axis in response to turns executed by said self-propelled vehicle.

14. The combination self-propelled vehicle and riding sulky attachment according to claim 10, further comprising a first planar shaped and foot supporting portion extending from one side of said elongate frame of said riding sulky a second planar shaped and foot supporting portion extending from the other side of said elongate frame, said first and second foot support portion being located at desired locations relative to said seat to provide foot support to the operator.

15. The combination self-propelled vehicle and riding sulky attachment according to claim 11, said first, second and third members of said elongate frame each further comprising a rectangular configuration in cross section.

16. The combination self-propelled vehicle and riding sulky attachment according to claim 10, said self-propelled vehicle further comprising a conventional walk-behind lawn mower having a downwardly facing lawn mower deck.

17. The combination self-propelled vehicle and riding sulky attachment according to claim 16, further comprising counter weights which are secured to a forward end of said lawn mower deck, said counter weights preventing lifting of said mower deck after attachment and during operation of said riding sulky.

* * * * *